United States Patent [19]

Minde et al.

[11] Patent Number: 5,432,778
[45] Date of Patent: Jul. 11, 1995

[54] METHOD AND AN ARRANGEMENT FOR FRAME DETECTION QUALITY ESTIMATION IN THE RECEIVER OF A RADIO COMMUNICATION SYSTEM

[75] Inventors: Tor B. Minde, Gammelstad; Nils P. Lundqvist, Ekero; Ulf T. Wahlberg, Bromma, all of Sweden

[73] Assignee: Telefonaktiebolaget LM Ericsson, Stockholm, Sweden

[21] Appl. No.: 79,865

[22] Filed: Jun. 23, 1993

[30] Foreign Application Priority Data

Jun. 23, 1992 [SE] Sweden ................... 9201923

[51] Int. Cl.⁶ ............................................ H04L 27/06
[52] U.S. Cl. ..................................... 370/95.3; 375/343
[58] Field of Search ................ 370/95.1, 95.3; 375/13, 375/14, 94, 96, 100, 101, 102, 58; 371/43, 45, 5.1, 5.5; 395/21

[56] References Cited

U.S. PATENT DOCUMENTS

| | | | |
|---|---|---|---|
| 4,885,757 | 12/1989 | Provence | 375/96 |
| 5,031,193 | 7/1991 | Atkinson et al. | 375/96 |
| 5,093,846 | 3/1992 | Walton et al. | 375/96 |
| 5,099,499 | 3/1992 | Hammar | 375/94 |
| 5,113,400 | 5/1992 | Gould et al. | 371/43 |
| 5,142,551 | 8/1992 | Borth et al. | 375/94 |
| 5,144,644 | 9/1992 | Borth | 375/96 |
| 5,150,379 | 9/1992 | Baugh et al. | 375/94 |
| 5,185,850 | 2/1993 | Usui et al. | 395/21 |
| 5,231,648 | 7/1993 | Driedger | 375/13 |
| 5,271,042 | 12/1993 | Borth et al. | 375/96 |
| 5,295,197 | 3/1994 | Takenaga et al. | 395/21 |

FOREIGN PATENT DOCUMENTS

WO91/06165  5/1991  WIPO.

OTHER PUBLICATIONS

R. Lippmann, "An Introduction to Computing with Neural Nets" IEEE ASSP Magazine, pp. 4–22 (Apr. 1987).

*Primary Examiner*—Douglas W. Olms
*Assistant Examiner*—Chau T. Nguyen
*Attorney, Agent, or Firm*—Burns, Doane, Swecker & Mathis

[57] ABSTRACT

A method and an arrangement for quality estimation when detecting an information frame, for instance a speech frame transmitted in a radio communication system in accordance with time division multiple access (TDMA), although the method can also be applied with frequency divided radio systems. There is used the soft information available in the radio receiver which is intended to detect the speech frame and process this signal information in accordance with those principles applicable to known neural nets. Prior to use, the neural net is aligned to the radio communication system concerned. The invention enables better information relating to possible error in the speech frame to be delivered to error correcting units in the radio receiver.

17 Claims, 3 Drawing Sheets

METHOD AND AN ARRANGEMENT FOR FRAME DETECTION QUALITY ESTIMATION IN THE RECEIVER OF A RADIO COMMUNICATION SYSTEM

BACKGROUND

The present invention relates to a method of achieving improved quality estimation when detecting information frames, and particularly when detecting erroneous speech frames in conjunction with channel decoding and subsequent speech decoding in the receiver of a radio communication system which operates, for instance, with time division multiple access (so-called TDMA). The inventive method, however, can also be used with frequency division radio systems (FDMA). The invention also relates to an arrangement in a radio station using the method.

In a radio system which operates with time division multiple access (e.g. TDMA), data messages and control messages are transmitted in bursts over certain time slots between a primary station (base station) and one or more secondary stations (mobiles).

The primary and the secondary stations both have a transmitter and a receiver side. The transmitter side includes a speech coder, channel coder and a modulator. The receiver side includes corresponding units, namely a demodulator, channel decoder and speech decoder.

Speech to be transmitted from, for instance, a secondary station (mobile) to a base station is speech-coded in the transmission side of the secondary station and is divided into speech frames prior to channel coding and transmission in the form of bursts in accordance with the access method (TDMA) concerned.

For instance, the speech coded signals may be divided in speech frames (which are not the same as the TDMA-frames) with coded speech samples and transmitted in accordance with a given access method (TDMA). For instance, the speech can be divided in speech frames each of 20 ms. This gives 160 samples at a sampling rate of 8 kHz, which in turn gives 260 bits/speech frames at a speech coding rate of 13 kbit/s.

The speech frames are coded in the channel coder in accordance with a given code, which may be a block code or a convolution code. Some of the bits in a speech frame are more sensitive, i.e. carry more important information and it is thus more important that these bits can be received correctly.

These more sensitive bits can be protected, by adding redundant parity bits in the channel coder. These redundant bits can be used for error detection and/or error correction of bit errors later-on in the receiver. The so-called bit error rate (i.e. quality) of a received message, e.g. a speech frame, may also be estimated in the receiver. When a bit-containing frame is received, the channel decoder uses the redundant bits to correct the most sensitive bits. If it is not possible to correct bit errors, it is necessary to indicate that the whole bit contents of the speech frame (or a part of a speech frame) is bad, i.e. erroneous.

When decoding speech in the receiver (speech synthesis), a bad frame can result in greatly impaired speech. The most sensitive, or susceptible, bits belong to such frame parameters as amplification and spectral distribution. When errors occur in bits which represent these parameters, the decoded and outgoing speech will be heavily distorted by slamming sound and disturbing noise.

One method of improving the subjective quality in a digital cellular system in which, for instance, fading distorts a complete speech frame, is to take action so as to reduce the speech distortion. One example of such action is to repeat the previously received error-free speech frame parameters and/or introduce limitations of the speech frame parameters.

To the same end, it is also known to introduce a so-called BFI (Bad Frame Indicator) into the channel decoder of the cellular radio system GSM (Global System for Mobile Communication). This gives an indication in the form of a binary signal to the speech decoder on the receiver side, which denotes whether a frame error has occurred or not.

In order to achieve good properties regarding the aforesaid known measures of improving the subjective speech quality, it is necessary to achieve good and accurate estimation of the quality of the speech frame data received. For instance, the error indication given by the bad frame indicator, BFI, used in the GSM-system is too coarse, since the BFI only gives a logic "1" for an error-free frame and a logic "0" for a bad or erroneous frame. Frame detection which is more bit selective, i.e. detection which indicates more precisely those parts of a frame which contain erroneous bits, would greatly improve the speech quality. Furthermore, the BFI itself may be erroneous. Error-free frames which are detected as being erroneous, and similarly non-detected erroneous frames, will impair the possibilities of taking error-correcting measures in the subsequent speech decoding process (the speech synthesis).

The aforesaid earlier known error detecting block code necessitates the addition of redundant bits to the speech data bits, which means that the bit rate must be increased. When the number of redundant bits is reduced, the block code becomes too weak to provide satisfactory error detection.

Another known method, on which the present method is based, involves the use of so-called soft information in frame error indicating processes. These values are already available to the detection process, and hence no additional parameters or bits which are able to influence the bit rate, such as when using block codes are inserted. However, the sole use of soft information in the error-indicating process, as is earlier known, does not provide the improvement that is provided with the use of block codes. The correlation between soft information and bit errors is often not sufficiently high for the frames received. Furthermore, the correlation varies with different types of channels. The metrics from a so-called Viterbi decoder in the receiver constitute an example of soft information.

SUMMARY

The present invention relates to a method in a radio receiver of improving the quality estimation when detecting information frames (speech or data), by using the soft information that is available in the receiver signal path in conjunction with a so-called neural net, with the purpose of obtaining an error indication which is better and more accurate that the indication given, for instance, by the aforesaid bad frame indicator (BFI). Such neural nets are known per se, but are applied here in a radio receiver for providing improved quality estimation of received information frames (speech or data) in a simple fashion.

The proposed method can also be applied to achieve improved quality estimation of parts of a speech frame, for instance a given block or a part of a given block within a speech frame.

BRIEF DESCRIPTION OF THE DRAWINGS

The invention will now be described in more detail with reference to the accompanying drawings, in which.

DETAILED DESCRIPTION

Figure 1:
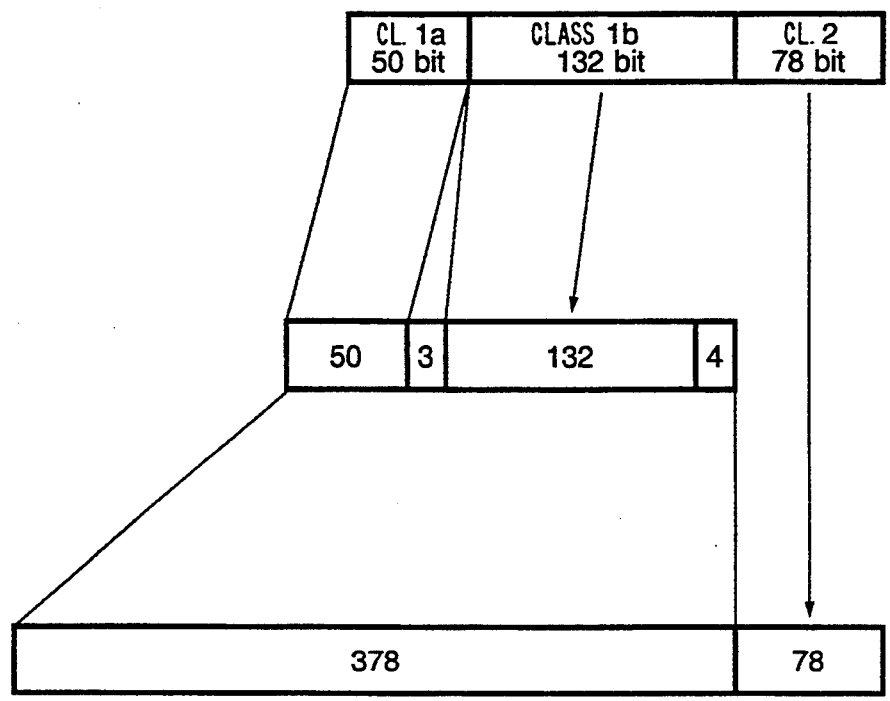
FIG. 1 illustrates the configuration of a speech frame.

Shown at the top of FIG. 1 is the configuration of a speech frame which contains originally 260 bits in accordance with what is prescribed in the GSM-recommendation, this speech frame being used in the illustrated embodiment solely by way of example.

The speech frame is divided into three blocks of which each defines one of three different classes. One block of 50 bits is assigned to class 1a, one block of 132 bits is assigned to class 1b, and the remaining block of 78 bits is assigned to class 2. The 260 bits are delivered from the speech coder and form the digitized speech after speech coding. A further speech frame of this kind is available after 20 ms, which results in a net bit rate of 13 kbit/s.

Class 1a designates the block of bits (50 bits) which are most sensitive to transmission error and which can cause the most difficult consequences with regard to the intelligibility of the transmitted and decoded speech. When errors are found in these bits, large parts of the immediately preceding, correct speech frame are repeated (downtoning) as described in GSM Recommendation 06.11. This error detection is effected with the aid of three parity bits which are added to the 50 data bits as control bits.

Class 1b designates the block of bits (132 bits) which is not protected by parity bits. Four bits are added as so-called tail bits. These 132 data bits are not equally as sensitive with regard to the intelligibility to transmission bit errors occurring as the bits in class 1a.

A convolution code is used on the bits included in the class 1a, 1b blocks and the three parity bits and four tail bits.

Class 2 designates blocks of 78 bits that are the least susceptible bits and are not protected at all by additional bits, as in the case of class 1a and 1b.

The three blocks in a speech frame thus contain $50+132+78=260$ bits apart from the $3+4=7$ parity bits. Of the 260 bits, $53+136=189$ bits are convolution coded with the rate $=\frac{1}{2}$, i.e. further 189 bits are added.

Thus, a speech frame from the channel coder will include a total of $378+78=456$ coded bits, which can be interleaved for inclusion in a plurality of physical TDMA-frames in a known manner.

Figure 2:
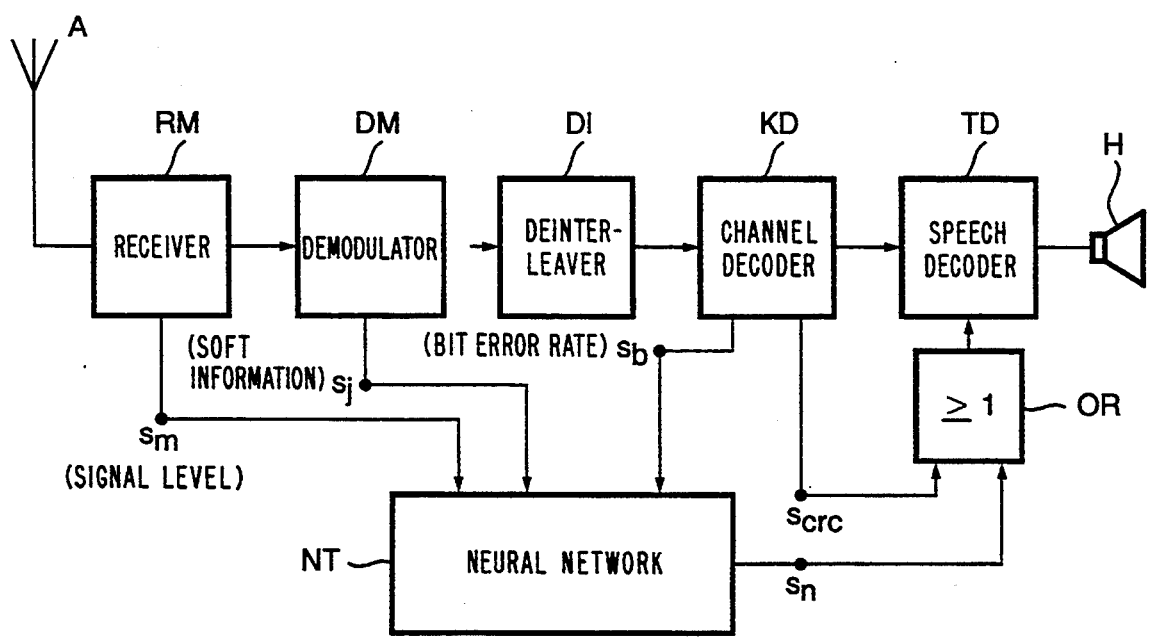
FIG. 2 is a block schematic which illustrates the receiver side of a radio station in which the inventive method is applied.

FIG. 2 is a block diagram illustrating that part of a radio receiver for time division multiple access (e.g. TDMA) with which the inventive method is concerned, and also shows an arrangement according to the present invention.

An antenna A of the receiver of a mobile telephone apparatus, for instance, receives radio signals over a certain radio channel. The signals (data/speech messages) transmitted over this channel may become strongly distorted, for instance due to fading, so that the TDMA-bursts give rise to a highly distorted speech frame.

Demodulation takes place in the radio receiver RM at a given radio frequency (in the GSM-system 865–935 MHz) in a known manner, so as to obtain a baseband modulated signal. The level of the radio signals incoming to the radio receiver RM can be measured and are referenced $s_m$ in FIG. 2.

The baseband modulated signal is demodulated in the demodulator DM within the IF-range, this demodulator also including an equalizer for compensating or correcting the multipath propagation to which the incoming signal has been subjected during transmission, in a known manner. In this regard, the signal can be equalized by means of a Viterbi equalizer in a known manner, for instance the manner described in Swedish Patent Application 9102611-2 which corresponds to commonly assigned U.S. patent application No. 07/942,443, now U.S. Pat. No. 5,341,401, that is incorporated here by reference.

So-called soft information is obtained from the equalizer (from, for example, a measurement of phase error) in the demodulator DM and/or from a measurement of signal strength of the output signal of the demodulator DM, this soft information being available and referenced $s_j$ in FIG. 2. This soft information may consist particularly of the information obtained subsequent to a first preliminary equalization of the baseband signal in accordance with WO-A 91/06165.

A deinterleaver DI is connected downstream of the demodulator/equalizer DM and recovers the time divided bursts intended for the receiver, in a known manner.

The main function of the channel decoder KD is to perform the opposite to the operation performed by the channel coder on the transmitter side, i.e. to recover transmitted information from the known redundant bits and the known channel coding (e.g. a convolution code). The channel decoder KD may also estimate the bit error rate (BER), for instance by decoding the received and decoded information bits and comparing the result with the bits received from the deinterleaver DI. The difference constitutes a measurement of the bit error rate. The channel decoder KD also provides a measurement as to how bad, or erroneous, a full speech frame is, so-called bad frame indicator BFI. As before mentioned, this magnitude is specified in the GSM-recommendation 05.05. Thus, there can be recovered from the channel decoder KD a signal $s_b$ which is a measurement of the bit error rate (BER) in the received demodulated and equalized radio signal, and a signal $s_{CRC}$ which indicates whether an error has occurred in the class 1a-block.

The decoded speech frames are delivered from the channel decoder KD to the speech decoder TD in a known manner, speech-frame by speech-frame, where a complete synthesis of received speech frames is effected so as to deliver speech signals to a sound reproduction unit H in the secondary station (mobile telephone apparatus).

According to the proposed invention, a so-called neural net NT is arranged on the receiver side of the secondary station, this net coacting with the speech decoder TD, with the purpose of obtaining a better and more accurate estimation of the quality of the received speech frames than that which can be obtained with the aforesaid frame indicator BFI, for instance.

The neural net NT receives one or more of the soft value parameters $s_m$, $s_j$ and $s_b$ from the radio receiver RM, the equalizer demodulator DM and the channel decoder KD respectively. Although not shown, the calculated indicator BFI can be used as an input value to the neural net NT.

Figure 3:
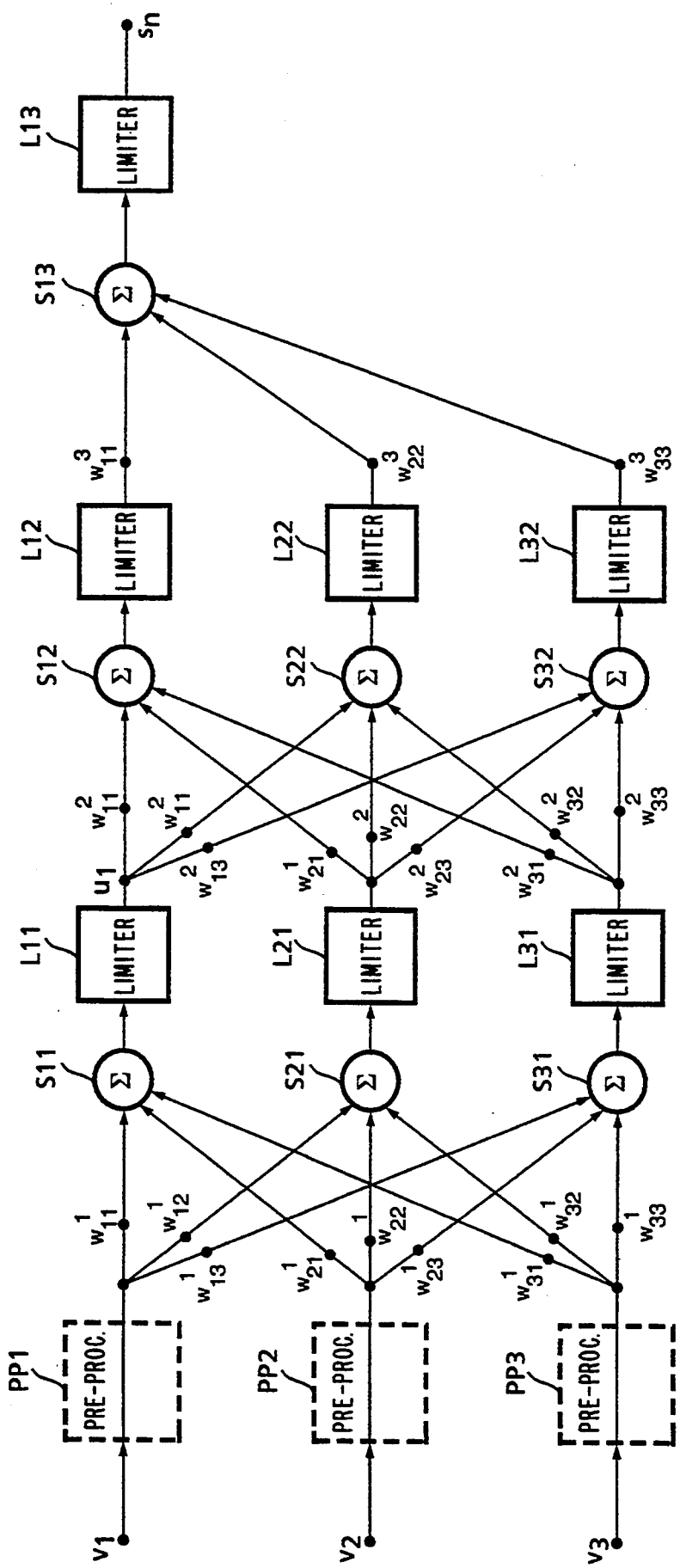
FIG. 3 illustrates in more detail a simplified neural net used in the receiver side shown in FIG. 2.

FIG. 3 illustrates an example of a neural net NT that can be used on the receiver side illustrated in FIG. 2. In this case, the neural net has three inputs $v_1$, $v_2$, $v_3$. Each of these inputs is connected to a summator S11, S21 and S31 and each of these summators receives the connections from remaining inputs.

Thus, the summator S11 receives the connections from the inputs $v_2$ and $v_3$ in addition to receiving the connection from input $v_1$.

Although not shown, there is provided in each of the connections a multiplier which multiplies respective input signals by a factor $w^i_{k,j}$ in accordance with the following:

Index i discloses the layers of the neural net, so that in the first layer (i=1), the input signal $v_1$ is multiplied by the factor $w^1_{11}$ and this multiplied signal is led to the summator S11;

$w^1_{12}$ and this multiplied signal is led to the summator S12;

$w^1_{13}$ and this multiplied signal is led to the summator S13.

Correspondingly, the input signal $v_2$ is multiplied by the factors $w^1_{21} w^1_{22}$ and $w^1_{23}$ prior to these signals being delivered to respective summators S11, S21 and S31.

Correspondingly, the input signal $v_3$ is multiplied by the factors $w^1_{31}$, $w^1_{32}$ and $w^1_{33}$ prior to these signals being delivered to respective summators S11, S21 and S31.

Limiters L11, L21 and L31 are connected to respective summators S11, S21, S31 for limiting the level of respective summator output signals.

These limiters conveniently have the form of non-linear stages with hyperbolic transmission functions, for instance tanh-functions.

The neural net illustrated in FIG. 3 has three layers, three nodes in the first two layers and a single output node. Naturally, it is also possible to increase (or decrease) the number of layers and nodes and to use more than one output from the network.

The network may optionally be supplemented with pre-processing units PP1–PP3 (the broken line blocks in FIG. 3). For instance, the pre-processing procedure may constitute lowpass filtration, normalization to a given level, the formation of an average value of a given number of bits beneath a given bit interval, variants estimation, and combinations of these measures.

The inputs $v_1$–$v_3$ receive, for instance, the magnitudes $s_m$, $s_j$ and $s_b$ according to FIG. 2. These are multiplied by respective factors $w^1_{k,j}$ in accordance with the above, and summated in the summators S11–S31. Respective summation values are then delivered to the respective non-linear limiter L11, L21 and L31.

The output magnitudes $u_1$, $u_2$, and $u_3$ from respective limiters are then $u_1 = f[(v_1 \cdot w^1_{11} + v_2 \cdot w^1_{21} + v_3 \cdot w^1_{31}) - b_1]$
$u_2 = f[(v_1 \cdot w^1_{12} + v_2 \cdot w^1_{22} + v_3 \cdot w^1_{32}) - b_2]$
$u_3 = f[(v_1 \cdot w^1_{13} + v_2 \cdot w^1_{23} + v_3 \cdot w^1_{33}) - b_3]$ where the function f is the transmission function of each of the non-linear limiters L11–L31 (assumed the same). As an example, the function can be chosen as $f(x) = \tanh x$ and where $b_j^1$ is a constant.

Multiplication, summation and non-linear operation and limitation of the magnitudes $u_1$–$u_3$ are carried out in an analogous manner, these magnitudes now forming input magnitudes to the second layer in the neural net.

The simplified neural net illustrated in FIG. 3 can be expanded to any desired number of levels m and any desired number of nodes $n_m$, as described in R. P. Lippmann "An introduction to computing with neural nets", IEEE ASSP Magazine, PP. 4–22, April 1987. In the simplified case illustrated in FIG. 3, $m = 3$
$n_1 = 3$
$n_2 = 3$
$n_3 = 1$ The proposed neural net enables a better boundary separation of the decision regions of the various soft values. The achievement of this is a non-linear problem which requires a non-linear solution, and since the decision functions of the neural net (the units S11, S21, . . . ) are non-linear, this constitutes a suitable solution to this problem.

However, in order for the neural net illustrated in FIG. 3 to improve the quality at which a frame error is indicated, the net must first be trained, i.e. it is first necessary to determine suitable values of the parameters $w^i_{j,k}$, $b^i_k$, which are then to be used in the neural net for receiving signals over a virtual radio channel.

Figure 4:
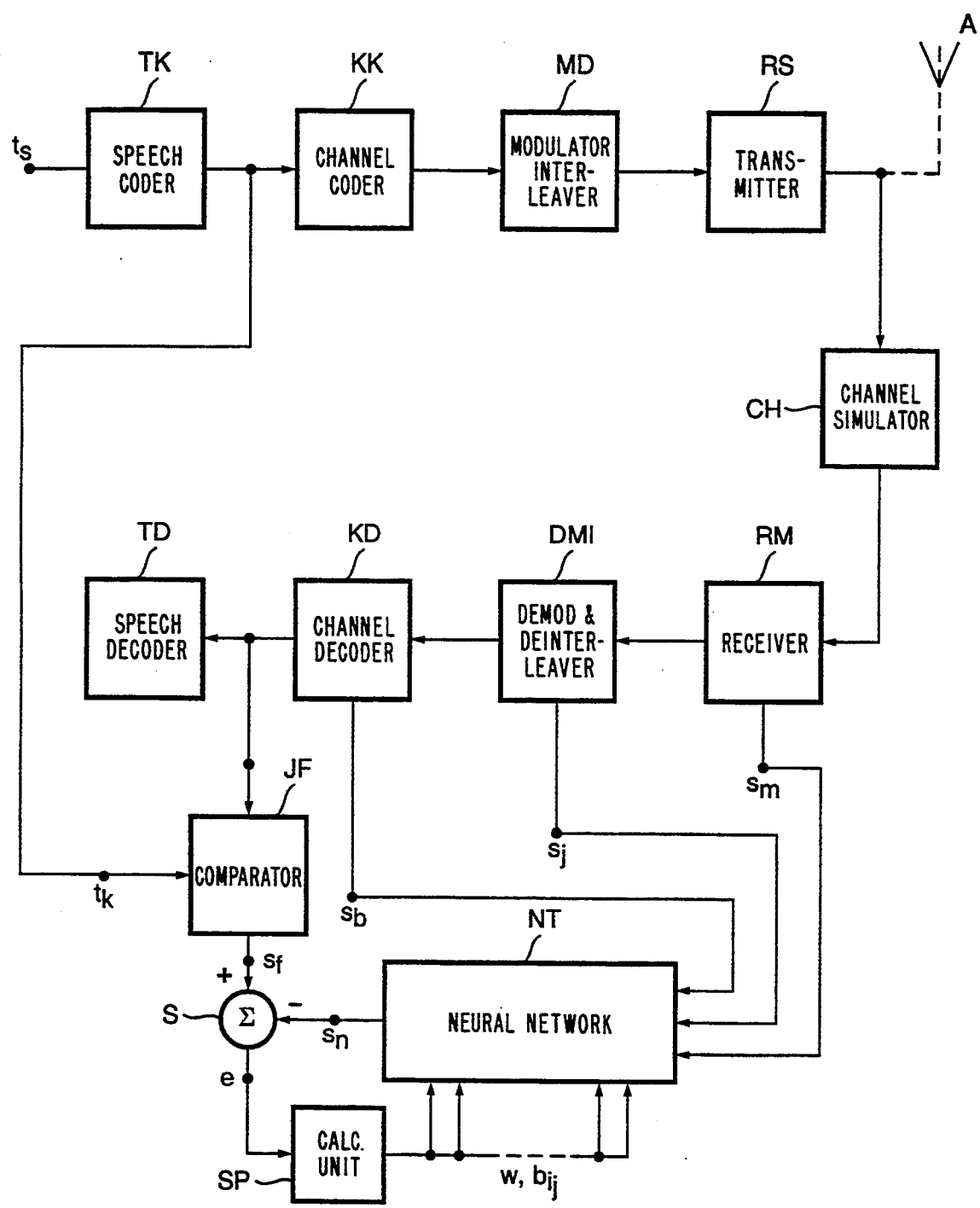
FIG. 4 is a block schematic which illustrates the transmitter-receiver side of a radio station of the same kind as that shown in FIG. 2 for training a neural net.

FIG. 4 is a block schematic of the transmitting and the receiving side of a radio station, for instance a mobile telephone apparatus, and illustrates how alignment of the neural net is achieved. It is assumed by way of example that the radio station transmits and receives time multiplexed signals with multiple access (TDMA), although the neural net can also be applied in a system in which coded time multiplexed signals with multiple access, so-called CDMA-signals are transmitted/received.

The transmitter side includes a speech coder TK, a channel coder KK, a block MD which includes the baseband modulator and the TDMA-interleaver, and also a radio transmitter RS which transmits a radio signal (the 900 MHz-band for GSM) to the antenna of the radio station. All of the aforesaid units are known to the art.

In the illustrated case, the output of the radio transmitter RS is connected to a simulator CH which simulates a radio channel with regard to fading, time dispersion, attenuation, etc.

The receiver side of the radio station includes those units previously described with reference to FIG. 2, namely the radio receiver RM, the demodulator with equalizer and deinterleaver referenced DMI, the channel decoder KD and the speech decoder TD. All of these units are known and need not be described in detail here. Those units included in the block schematic shown in FIG. 4 and functioning to align the neural net NT are a comparator JF, a difference former (summator) S and a calculating unit SP.

One input of the comparator JF is connected to the output of the speech coder TK over which the desired speech coded signal is obtained. The other input is connected to the input of the speech coder on the receiver side over which there occurs the speech signal which was disturbed over the radio channel CH but at least partially corrected in the receiver. The two signals delivered to the comparator inputs both occur in the form of speech frames (FIG. 1).

The output signal $s_f$ of the comparator JF represents a BFI-value which is characteristic for the transmitter-receiver used and which is the BFI-value that can be expected when using one such type of radio station in a virtual channel case. It is this BFI-value which shall be improved by means of the neural net.

The neural net NT is therefore connected in the manner illustrated in FIG. 3, with its three inputs connected in the manner described earlier with reference to FIG. 2 and with its output $s_n$ connected to the input of the difference former S, the other input of which receives the output signal $s_f$. This output signal thus forms the difference between a) a signal $s_f$ which indicates the value of the frame error that is obtained without using the neural net and which thus constitutes a real value, and b) a signal $s_n$ which denotes the improved quality value of the frame error indication desired, i.e. a setpoint or control value.

The difference between the signals $s_f$ and $s_n$ produces an error signal e which is delivered to the calculating unit SP. This unit calculates the values of the parameters $w^i_{j,k}$ and $b^i_k$ in different calculating steps as a function of the error e concerned and in dependence on the values of the parameters $w^i_{j,k}$ and $b^i_k$ calculated in preceding calculating steps, and the error e as described in the aforesaid reference to Lippmann (see in particular page 17), which is incorporated here by reference.

The aforesaid alignment of the neural net can be effected in conjunction with trimming respective stationary units and may be a relatively complicated procedure which requires some time to carry out. The neural net, however, is relatively simple in itself and causes no unnecessary complication of the receiver side in practice when training of the neural net has been completed.

The proposed method is unable to rectify errors in the speech frames and is also unable to improve directly the error correction performed in the receiver. However, the method does provide a freer appraisal of an error when receiving the speech frames than that afforded, for instance, by the known BFI:n, and therewith functions to supply better error information to the error correcting units, primarily to the speech decoder, which results in better speech quality.

What is claimed is:

1. In a radio communication system in which radio signals are transmitted between a primary station and a secondary station in accordance with a predetermined access method, a method of processing a received radio signal that includes a received information frame transmitted in accordance with the access method, comprising the steps of:

recovering soft information from the received radio signal, the soft information comprising a number of value signals;

scaling each value signal with a respective predetermined coefficient to form scaled value signals;

combining the scaled value signals to form a predetermined number n of summation value signals, wherein n is an integer greater than or equal to 1;

non-linearly processing each of the summation value signals to form n new value signals;

evaluating at least one of the new value signals to obtain a measurement signal that is indicative of the quality of the information frame; and using the measurement signal to adjust the received radio signal.

2. The method of claim 1, further comprising the step of performing the scaling, combining, and non-linearly processing steps a plurality of times, including a first performance of the scaling, combining, and non-linearly processing steps and later performances of the scaling, combining, and non-linearly processing steps, prior to performing the evaluating step.

3. The method of claim 2, wherein the number of summation value signals formed by the first performance of the combining step differs from numbers of summation value signals formed by later performances of the combining step.

4. The method of claim 1, wherein the non-linearly processing step comprises the step of subtracting respective predetermined constant signals from the summation value signals.

5. The method of claim 4, further comprising the step of combining the measurement signal with another measurement signal that is indicative of an error in the information frame in accordance with a binary "OR"-function.

6. The method of claim 1, further comprising the step of combining the measurement signal that is indicative of the quality of the information frame obtained by the evaluating step with a second measurement signal that is indicative of an error in the information frame.

7. The method of claim 1, wherein the soft information is recovered from one or more bit error rates estimated by a channel decoder of a receiver, from a signal strength of an output signal from a demodulator, from an estimated phase error in the demodulator, and from a level of the radio signal.

8. The method of claim 1, wherein the step of using the measurement signal to adjust the received radio signal comprises the steps of:

deriving a speech frame from the received radio signal and supplying the speech frame to a speech decoder; and using the measurement signal to control error handling in the speech decoder.

9. In a radio station which includes first means for providing an output signal representing a measurement of a level of a radio signal incoming to a receiver in the radio station, second means for producing an output signal representing a metric when demodulating the incoming radio signal in a demodulator, and third means for producing an output signal representing a measurement of a receive quality of a demodulated signal produced by the demodulator, an apparatus comprising:

a neural net having at least two layers and at least two nodes, wherein two inputs of the at least two nodes receive the output signals from two means selected from the group consisting of the first, second and third means, and the neural net generates an output signal that is provided to fourth means in the radio station, said fourth means evaluating the neural net output signal to improve functioning of the radio station.

10. The apparatus of claim 9, wherein the fourth means includes: a speech decoder; and means for using the neural net output signal to control error handling in the speech decoder.

11. In a radio communication system in which radio signals are transmitted between a primary station and a secondary station in accordance with a predetermined access method, an apparatus for estimating a quality of a received information frame transmitted in accordance with the access method to provide a better estimation of a frame error comprising:

means for recovering soft information from a received radio signal that includes the received information frame, the soft information comprising a number of value signals;

layer means, coupled to the means for recovering soft information, comprising:

first means for scaling each value signal with a respective predetermined coefficient to form scaled value signals;

first means for combining the scaled value signals to form a predetermined number n of summation value signals, wherein n is an integer greater than or equal to 1; and first means for non-linearly processing each of the summation value signals to form n new value signals; and means, coupled to the layer means, for evaluating at least one of the new value signals to obtain a measurement of the quality of the information frame.

12. The apparatus of claim 11, wherein the layer means further comprises:

second means for scaling each of the n new value signals with a respective second predetermined coefficient to form scaled new value signals;

second means for combining the scaled new value signals to form a predetermined number m of new summation value signals, wherein m is an integer greater than or equal to 1; and second means for non-linearly processing each of the new summation value signals to form m new value signals.

13. The apparatus of claim 12, wherein the number of summation value signals formed by the first means for combining differs from the number of new summation value signals formed by the second means for combining.

14. The apparatus of claim 11, wherein the first means for non-linearly processing comprises means for subtracting respective predetermined constant signals from the summation value signals.

15. The apparatus of claim 14, further comprising means for combining the quality measurement with another measurement signal that is indicative of an error in the information frame in accordance with a binary "OR"-function.

16. The apparatus of claim 11, further comprising means for combining the measurement of the quality of the information frame obtained by the means for evaluating with a second measurement of an error in the information frame.

17. The apparatus of claim 11, wherein means for recovering recovers the soft information from one or more bit error rates estimated by a channel decoder of a receiver, from a signal strength of an output signal from a demodulator, from an estimated phase error in the demodulator, and from a level of the radio signal.

* * * * *